United States Patent Office 3,480,347
Patented Nov. 25, 1969

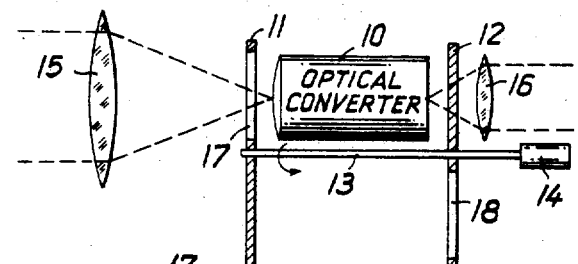
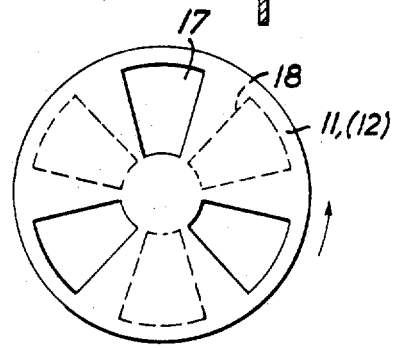
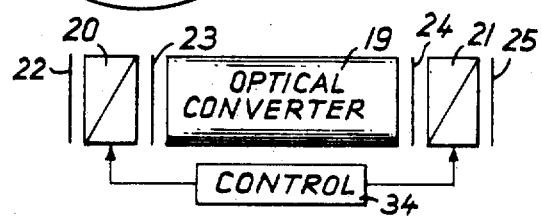
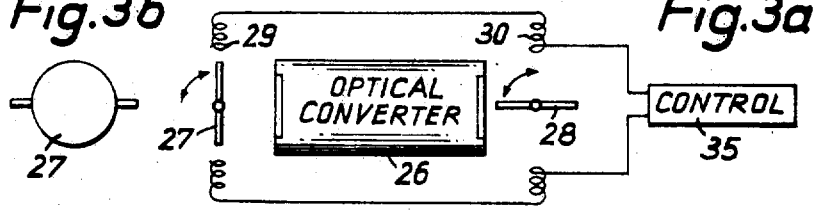
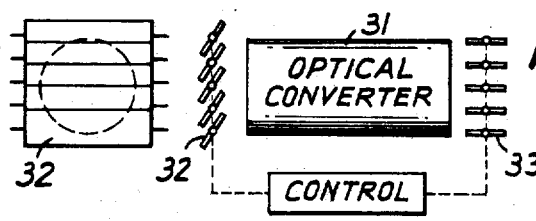

3,480,347
OPTICAL DEVICE FOR PROTECTION AGAINST LASER BEAMS
Conrad Walter, Hamburg-Poppenbuttel, and Siegfried Eberwein, Wedel, Holstein, Germany, assignors to Licentia Patent-Verwaltungs G.m.b.H., Frankfurt am Main, Germany
Filed Feb. 16, 1967, Ser. No. 616,706
Claims priority, application Germany, Feb. 18, 1966, L 52,959
Int. Cl. G02f 1/26, 1/30
U.S. Cl. 350—160                5 Claims

ABSTRACT OF THE DISCLOSURE

An optical protective device including an optical converter with afterglow effect positioned in the light beam path between a light entrance aperture and a light exit aperture. A pair of shutters are positioned on opposite sides of the optical converter, and the shutters are alternately opened and closed to admit laser beams to the optical converter while the light exit aperture is blocked, and to admit afterglow beams through the light exit aperture while the light entrance aperture is blocked.

BACKGROUND OF THE INVENTION

This invention relates to means for protection against laser beams in optical scanning units containing an optical converter with afterglow effect positioned in the light beam path between a light entrance aperture and a light exit aperture.

The use of lasers for range finders, particularly in military applications, involves the danger of serious damage to the observer's eye due to the high energy density of laser beams. This is particularly true when the observer's eye is shielded, because in this case, the entrance pupil is larger, and therefore admits more light than the unshielded human eye. In addition, the light beams in the shielded case are focussed, which magnifies their damaging effect.

It is difficult to protect the observer's eye from damage when the damaging impulse carries the information that is to be observed. To register the information, the light beam must reach the observer's eye, but to protect the observer against eye damage, the light beam should not reach the observer's eye.

It might appear that this dilemma could be resolved by providing filters which are impermeable to the wave lengths transmitted by the laser but which permit visible light to pass. There are, however, no filters and no combination of filters available which would be impermeable in all cases to the wave lengths of different lasers. The Ruby laser, for example, emits a different wave length than a neodymium laser. The filters furthermore give only limited protection due to the high power of the laser impulses.

SUMMARY OF THE INVENTION

The object of this invention is to solve the above-noted problem by providing effective protection against laser beams for optical scanning units containing an optical converter. In accordance with this invention, a pair of shutters are positioned on opposite sides of the optical converter, and the shutters are alternately opened and closed to admit laser beams to the optical converter while the light exit aperture is blocked and to admit light beams through the light exit aperture when the light entrance aperture is blocked.

Prerequisite for this protective device is that an optical element utilizing the afterglow effect, for instance an image converter, is disposed within the beam path between the entrance aperture and the exit aperture of the scanning unit. The arrangement according to this invention guarantees that no beam of light can pass through the optical scanning unit.

Several possibilities exist for optical shutters. Rotating discs provided with sector-shaped cut-outs can be positioned in front of and behind the optical converter with a motor serving as the control mechanism, whereby the disc sectors are offset from each other in the direction of the laser beam entrance. If the size of the sector-shaped cut-outs in the rotating discs is selected so that the ratio between open and closed state at the entrance of the converter is 6:7, then the converter is also protected against damaging laser impulses 60% of the time.

The shutter can also comprise a Kerr cell having polarization filters disposed in front of and behind it, with an electrical control mechanism that continuously alternates in activating one Kerr cell and de-activating the other. The polarization filters in front of and behind each Kerr cell are disposed transverse to each other. Light will be admitted when a voltage is applied to the Kerr cell and blocked when the voltage is removed from the Kerr cell, since the Kerr cell rotates the plane of the polarized light when the voltage is applied but does not alter the polarized light when the voltage is absent.

The shutters may comprise a pair of pivotally mounted light-impermeable covers whose rotation axis lies in a plane vertical to the axis of the optical converter with the covers being moved by means of electromagnets. These pivotally mounted covers are moved by the electromagnets in such a manner that the entrance and the exit of the optical converter are alternatingly opened or closed.

The shutters may further comprise a pair of louvers positioned in front of and behind the optical converter, with a control mechanism for alternately opening and closing the louvers.

The opening and closing times of the optical shutters line within certain limits which are determined on the one hand by the afterglow time of the optical converter picture screen and on the other hand by the speed of a beam between two shutters. The time which passes between exposure of the optical converter's photo cathode and opening of the exit shutter must therefore be between 1 ms. and 0.3 ns. The time between two openings must furthermore be less than 20 ms. to prevent a flicker effect from occurring.

The laser beam protection device of this invention has the advantages of guaranteeing protection independent of wave length and independent of the laser beam impulse power. The protection is also independent of the time duration of the impulse, for protection against the borderline case involving continuous illumination. The optical converter is also provided with a protection of about 60%. Moreover, the cost of a protective device for a binocular visual indicator is no greater than for a monocular visual indicator.

BRIEF DESCRIPTION OF THE DRAWINGS

FIGURE 1a is a vertical cross-sectional view of one embodiment of the invention.

FIGURE 1b is a front view of the rotatable shutters shown in FIGURE 1a.

FIGURE 2 is a vertical cross-sectional view of a second embodiment of the invention.

FIGURE 3a is a vertical cross-sectional view of a third embodiment of the invention.

FIGURE 3b is a front view of one of the pivotally mounted covers shown in FIGURE 3a.

FIGURE 4a is a vertical cross-sectional view of a fourth embodiment of the invention.

FIGURE 4b is a vertical cross-sectional view of one of the louvers shown in FIGURE 4a.

DESCRIPTION OF THE PREFERRED EMBODIMENTS

In FIGURE 1a, rotatable discs 11 and 12 are disposed in front of and behind an optical converter 10 with afterglow effect. Rotatable discs 11 and 12 are rigidly connected to an axle 13, which is driven by a driving motor 14. This combination of the rotating discs 11 and 12 is placed in the light beam path of an optical observation instrument, which is represented in FIGURE 1a by the image converter 10 and by a lens 15 and an eye piece 16. The rotating discs 11 and 12 are provided with sector-shaped cutouts 17 and 18, as shown in FIGURE 1b. The discs 11 and 12 are disposed on the axle 13 in such a manner that the disc sectors 17 and 18, seen in the direction of the light beams, are offset from each other. In this manner, a light beam can never travel directly through the optical scanning unit. Visual observations are nonetheless possible because of the afterglow effect of converter 10. A laser beam, which can easily penerate the fluorescent screen of the converter 10, is stopped either at the rotating disc 11 or by the rotating disc 12.

In FIGURE 2, a pair of Kerr cells 20 and 21 are disposed in front of and behind a converter 19 in the light beam path of an optical scanning unit, which is indicated in FIGURE 2 only by the optical converter 19. In front of and behind each Kerr cell 20 or 21, respectively, are polarizers 22 and 23, or 24 and 25, the polarizers being disposed transverse to each other. A control circuit 34 applies voltage pulses alternately to Kerr cells 20 and 21 to alternately open and close the shutters formed by the Kerr cells and their corresponding polarizers 22, 23, 24, and 25. In place of the Kerr cells, other crystals can be used which rotate the polarization plane of light in response to the application of voltage.

In FIGURE 3a, a pair of rotatable covers 27 and 28 are disposed in front of and behind an optical image converter 26. The pivoting axes of the covers 27 and 28 are disposed in a plane vertical to the axis of the optical converter 26. The rotatable covers 27 and 28 are moved by electromagnets 29 and 30 in such a manner that their planes are alternatingly vertical to the axis of the optical converter 26. The electromagnets are alternately energized by control circuit 35. FIGURE 3b shows a front view of cover 27.

In FIGURE 4a, a pair of louvers 32 and 33 are disposed in front of and behind an optical converter 31. The pivoting plane of the louvers 32 and 33 is again vertical to the axis of the converter 31. FIGURE 4b shows a front view of louver 32. The louvers 32 and 33 are alternatingly opened and closed by control means 36.

It will be understood that the above description of the present invention is susceptible to various modifications, changes, and adaptations, and the same are intended to be comprehended within the meaning and range of equivalents of the appended claims.

We claim:
1. In an optical device having a light entrance aperture, a light exit aperture, and a light beam path extending between said light entrance aperture and said light exit aperture, a laser beam protective device comprising, in combination:
   (a) an optical converter positioned in said light beam path between said light entrance aperture and said light exit aperture, said optical converter incorporating means for utilizing the afterglow effect;
   (b) a first shutter positioned in said light beam path between said optical converter and said light entrance aperture;
   (c) a second shutter positioned in said light beam path between said optical converter and said light exit aperture; and
   (d) means for alternately opening and closing said shutters for passing light through said first shutter when said second shutter is closed and for passing light through said second shutter when said first shutter is closed.

2. The combination defined in claim 1 wherein each of said shutters comprises a rotatable disc having sector-shaped openings, and wherein said means for alternately opening and closing said shutters comprises motor means for rotating said discs with the openings therein angularly offset from each other between the discs.

3. The combination defined in claim 1 wherein each of said shutters comprises a Kerr cell, a first polarization filter in front of said Kerr cell, and a second polarization filter behind said Kerr cell, and wherein said means for alternately opening and closing said shutters comprises electrical means for alternately activating said Kerr cells.

4. The combination defined in claim 1 wherein each of said shutters comprises a pivotally mounted light-impermeable cover, the pivoting axis of each cover being in a plane vertical to the axis of the optical converter, and wherein said covers are pivoted by means of electromagnets.

5. The combination defined in claim 1 wherein each of said shutters comprises a louver and a control mechanism for opening and closing said louver.

References Cited

UNITED STATES PATENTS

| | | | |
|---|---|---|---|
| 3,384,147 | 5/1968 | Smith | 350—275 |
| 3,060,807 | 10/1962 | Huston | 350—150 |
| 2,371,744 | 3/1945 | Eagle | 350—275 |

RONALD L. WIBERT, Primary Examiner

CONRAD CLARK, Assistant Examiner

U.S. Cl. X.R.

350—266, 275